(12) United States Patent
Fujisawa et al.

(10) Patent No.: US 9,473,249 B2
(45) Date of Patent: Oct. 18, 2016

(54) LIGHT TRANSMISSION APPARATUS, LIGHT COMMUNICATION SYSTEM, LIGHT RECEPTION APPARATUS, METHOD FOR ADJUSTING LIGHT TRANSMISSION, METHOD FOR TRANSMITTING LIGHT, AND METHOD FOR RECEIVING LIGHT

(71) Applicant: NEC Corporation, Minato-ku, Tokyo (JP)

(72) Inventors: Shinsuke Fujisawa, Tokyo (JP); Daisaku Ogasahara, Tokyo (JP); Toru Takamichi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 63 days.

(21) Appl. No.: 14/391,908

(22) PCT Filed: Jan. 30, 2013

(86) PCT No.: PCT/JP2013/000479
§ 371 (c)(1),
(2) Date: Oct. 10, 2014

(87) PCT Pub. No.: WO2013/153719
PCT Pub. Date: Oct. 17, 2013

(65) Prior Publication Data
US 2015/0043925 A1    Feb. 12, 2015

(30) Foreign Application Priority Data

Apr. 10, 2012 (JP) .................................. 2012-089622

(51) Int. Cl.
*H04B 10/12* (2006.01)
*H04B 10/564* (2013.01)
(Continued)

(52) U.S. Cl.
CPC ........ *H04B 10/564* (2013.01); *H04B 10/0799* (2013.01); *H04B 10/2543* (2013.01); *H04B 10/60* (2013.01); *H04B 10/614* (2013.01); *H04B 10/616* (2013.01)

(58) Field of Classification Search
CPC ............................ H04B 10/564; H04B 10/60
See application file for complete search history.

(56) References Cited

U.S. PATENT DOCUMENTS

2005/0226631 A1* 10/2005 Thomson ......... H04B 10/25133
398/149
2007/0047969 A1   3/2007 Nakashima et al.
(Continued)

FOREIGN PATENT DOCUMENTS

| JP | 2003-234703 A | 8/2003 |
|----|---------------|--------|
| JP | 2007-67902 A  | 3/2007 |
| JP | 2011-211516 A | 10/2011 |

OTHER PUBLICATIONS

Daisaku Ogasahara et al., "Real-Time Evaluation of Optical Nonlinear Effects on 112Gbps PM-QPSK Signal in Dispersion Managed Links", Optical Society of America, OMR3.pdf, OSA/OFC/NFOEC, 2011, (received Feb. 27, 2013).
(Continued)

*Primary Examiner* — Dzung Tran

(57) ABSTRACT

An optical signal generation unit (110) generates an optical signal for transmission by adding modulation based on a driving signal to a carrier wave. A filtering unit (120) performs a filtering process on the driving signal. The filtering unit (120) may perform time domain equalization, and may perform frequency domain equalization. Specifically, the filtering unit (120) performs a filtering process on the driving signal, and thus sets a peak value of a power spectral density of the optical signal for transmission to be equal to or less than a second reference value while an integrated value obtained by integrating the power spectral density of the optical signal for transmission in a frequency direction is maintained at equal to or greater than a first reference value.

17 Claims, 13 Drawing Sheets

(51) Int. Cl.
*H04B 10/2543* (2013.01)
*H04B 10/61* (2013.01)
*H04B 10/60* (2013.01)
*H04B 10/079* (2013.01)

(56) References Cited

U.S. PATENT DOCUMENTS

| | | | | |
|---|---|---|---|---|
| 2009/0245816 | A1* | 10/2009 | Liu | H04B 10/60 398/208 |
| 2012/0039607 | A1* | 2/2012 | Ogasahara | H04B 10/6971 398/65 |
| 2012/0087654 | A1* | 4/2012 | Ogasahara | H04J 14/06 398/29 |
| 2012/0269234 | A1* | 10/2012 | Zhang | H04L 5/0007 375/143 |

OTHER PUBLICATIONS

Chunmin Xia et al., "Improved EDC Performance for Different Duobinary Modulation Formats with Optical Filtering", ECOC 2008, Sep. 21-25, 2008, p. 3.03, vol. 5, pp. 111-112.

Yanir London et al., "Nonlinear Effects Mitigation in Coherent Optical OFDM System in Presence of High Peak Power", Journal of Lightwave Technology, Nov. 1, 2011, vol. 29, No. 21, pp. 3275-3281.

International Search Report for PCT Application No. PCT/JP2013/000479, mailed on Feb. 26, 2013.

* cited by examiner (a)

(b)

LIGHT TRANSMISSION APPARATUS, LIGHT COMMUNICATION SYSTEM, LIGHT RECEPTION APPARATUS, METHOD FOR ADJUSTING LIGHT TRANSMISSION, METHOD FOR TRANSMITTING LIGHT, AND METHOD FOR RECEIVING LIGHT

This application is a National Stage Entry of PCT/JP2013/000479 filed on Jan. 30, 2013, which claims priority from Japanese Patent Application 2012-089622 filed on Apr. 10, 2012, the contents of all of which are incorporated herein by reference, in their entirety.

TECHNICAL FIELD

The present invention relates to a light transmission apparatus, a light communication system, a light reception apparatus, a method for adjusting a light transmission apparatus, a method for transmitting light, and a method for receiving light which use an optical signal.

BACKGROUND ART

Traffic volumes of backbone networks have rapidly increased with the spread of the Internet. In order to cope with this trend, speeding up in long-distance optical communication is required strongly. Techniques coping with the speeding up of optical communication include an optical phase modulation system utilizing a digital signal processing technique and a polarization multiplex separation technique. A technique in which the optical phase modulation system and the polarization multiplex separation technique are combined, that is, a so-called optical digital coherent communication system can realize speeding up in long-distance optical communication, and thus has attracted attention in recent years.

Meanwhile, Patent Document 1 discloses a technique in which, in a Mach-Zehnder optical modulator, the power density of a carrier spectral component is minimized. In addition, Patent Document 1 also discloses a technique in which the power density of a sideband wave is maximized instead of the power density of the carrier spectral component being minimized.

RELATED DOCUMENT

Patent Document

[Patent Document 1] Japanese Unexamined Patent Publication No. 2003-234703

DISCLOSURE OF THE INVENTION

An optical signal is subject to a phase fluctuation proportional to the square of amplitude due to a non-linear optical effect during its transmission through a light transmission path. For this reason, the transmission characteristics of the optical signal are deteriorated.

An object of the invention is to provide a light transmission apparatus, a light communication system, alight reception apparatus, a method for adjusting a light transmission apparatus, a method for transmitting light, and a method for receiving light which are capable of preventing an optical signal from being deteriorated during its transmission through a light transmission path.

According to the present invention, there is provided a light transmission apparatus including: an optical signal generation unit that generates an optical signal for transmission by adding modulation based on a driving signal to a carrier wave; and a filtering unit that performs a filtering process on the optical signal for transmission or the driving signal, wherein the filtering unit sets a peak value of a power spectral density of the optical signal for transmission to be equal to or less than a second reference value while maintaining an integrated value obtained by integrating the power spectral density of the optical signal for transmission in a frequency direction at equal to or greater than a first reference value.

According to the present invention, there is provided a light transmission apparatus including: an optical signal generation unit that generates an optical signal for transmission by adding modulation based on a driving signal to a carrier wave; and a filtering unit that performs a filtering process on the optical signal for transmission or the driving signal, wherein the filtering unit makes an amplification factor of the optical signal for transmission at a frequency where a power spectral density is equal to or greater than a reference value lower than an amplification factor of the optical signal for transmission at a frequency where the power spectral density is equal to or less than the reference value.

According to the present invention, there is provided a light communication system including: a light transmission apparatus that transmits an optical signal for transmission; and a light reception apparatus that receives the optical signal for transmission, wherein the light transmission apparatus includes an optical signal generation unit that generates an optical signal for transmission by adding modulation based on a driving signal to a carrier wave, and a first filtering unit that performs a filtering process on the optical signal for transmission or the driving signal, using a first filter coefficient, and the filtering unit sets a peak value of a power spectral density of the optical signal for transmission to be equal to or less than a second reference value while maintaining an integrated value obtained by integrating the power spectral density of the optical signal for transmission in a frequency direction at equal to or greater than a first reference value.

According to the present invention, there is provided a light reception apparatus including a compensation unit that perform a filtering process on a signal which is generated on the basis of an optical signal for transmission transmitted from a light transmission apparatus, wherein the optical signal for transmission is added with a first process in which a peak value of a power spectral density of the optical signal for transmission is set to be equal to or less than a second reference value while an integrated value obtained by integrating the power spectral density of the optical signal for transmission in a frequency direction is maintained at equal to or greater than a first reference value, and the compensation unit performs a second process of compensating for the first process.

According to the present invention, there is provided a method for adjusting a light transmission apparatus including: preparing a light transmission apparatus which is provided with an optical signal generation unit that generates an optical signal for transmission by adding modulation based on a driving signal to a carrier wave and a filtering unit that performs a filtering process on the optical signal for transmission or the driving signal; and adjusting a filter coefficient in the filtering unit while measuring an integrated value obtained by integrating a power spectral density of the optical signal for transmission in a frequency direction, and a peak value of the power spectral density of the optical signal for transmission, to set the peak value to be equal to or less than a second reference value while maintaining the integrated value at equal to or greater than a first reference value.

According to the present invention, there is provided a method for transmitting light including: generating an optical signal for transmission by adding modulation based on a driving signal to a carrier wave; and performing a filtering process in which a peak value of a power spectral density of the optical signal for transmission is set to be equal to or less than a second reference value while an integrated value obtained by integrating the power spectral density of the optical signal for transmission in a frequency direction with respect to the optical signal for transmission or the driving signal is maintained at equal to or greater than a first reference value, and then transmitting the optical signal for transmission.

According to the present invention, there is provided a method for receiving light including receiving an optical signal for transmission, generated by modulating a carrier wave, on which a first process is performed in which a peak value of a power spectral density of the optical signal for transmission is set to be equal to or less than a second reference value while an integrated value obtained by integrating the power spectral density of the optical signal for transmission in a frequency direction is maintained at equal to or greater than a first reference value, and performing a second process of compensating for the first process on a signal which is generated on the basis of the optical signal for transmission.

According to the present invention, it is possible to prevent an optical signal from being deteriorated during its transmission through a light transmission path.

BRIEF DESCRIPTION OF THE DRAWINGS

The above-mentioned objects, other objects, features and advantages will be made clearer from the preferred embodiments described below, and the following accompanying drawings.

DESCRIPTION OF EMBODIMENTS

Figure 1:
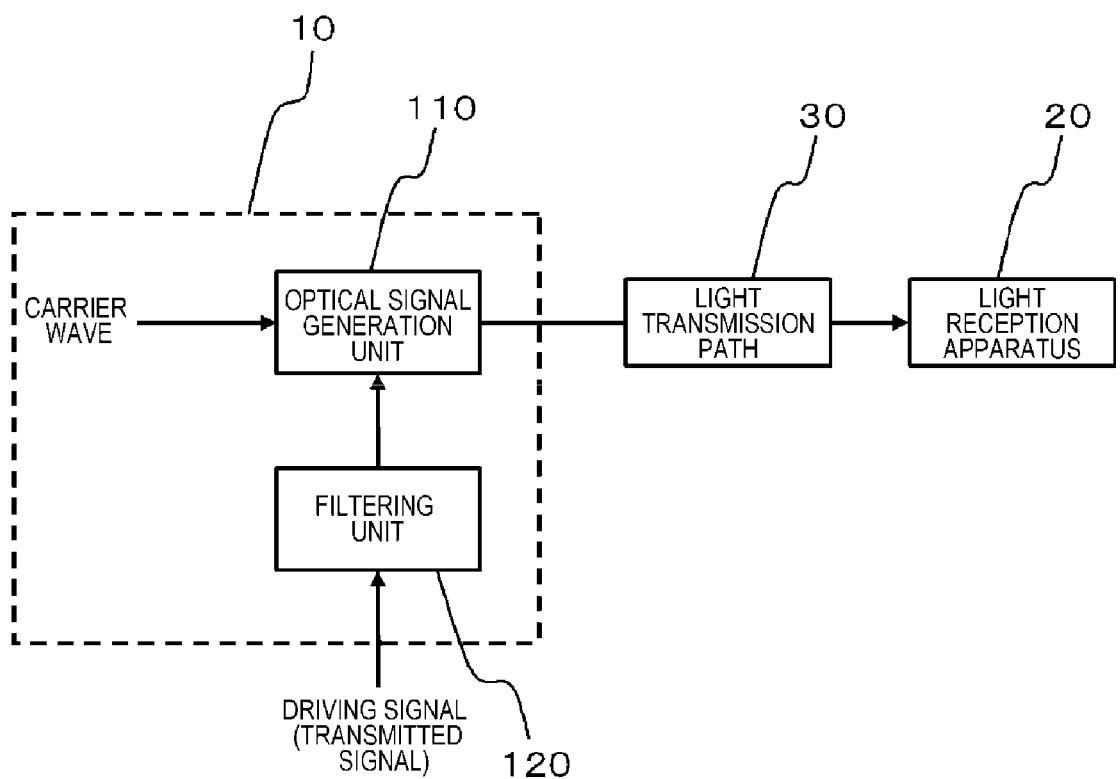
FIG. 1 is a diagram illustrating a configuration of a light transmission apparatus according to a first embodiment together with the environment of its use.

Hereinafter, embodiments of the present invention will be described with reference to the accompanying drawings. In all the drawings, like elements are referenced by like reference numerals and descriptions thereof will not be repeated.

First Embodiment

FIG. 1 is a diagram illustrating a configuration of a light transmission apparatus 10 according to a first embodiment together with the environment of its use. The light transmission apparatus 10 includes an optical signal generation unit 110 and a filtering unit 120. The optical signal generation unit 110 generates an optical signal for transmission by adding modulation based on a driving signal (transmitted signal) to a carrier wave. The filtering unit 120 performs a filtering process on the driving signal. The filtering unit 120 may perform time domain equalization, and may perform frequency domain equalization. Specifically, the filtering unit 120 performs a filtering process on the driving signal, and thus sets the peak value of the power spectral density of the optical signal for transmission to be equal to or less than a second reference value while an integrated value obtained by integrating the power spectral density of the optical signal for transmission in a frequency direction is maintained at equal to or greater than a first reference value. Here, the integration interval of the power spectral density is a frequency domain targeted for a filtering process, that is, an interval extending across positive and negative directions by a maximum of a symbol rate centered on a carrier wave frequency. The optical signal for transmission generated by the optical signal generation unit 110 is transmitted to a light reception apparatus 20 through a light transmission path 30. The light reception apparatus 20 constitutes a light communication system together with the light transmission apparatus 10.

A non-linear optical effect in an optical fiber is proportional to the power spectral density of the optical signal for transmission. However, when the power spectral density of the optical signal for transmission is simply made lower, a reduction is caused in the signal-to-noise (SN) ratio of the optical signal for transmission. On the other hand, in the present embodiment, an integrated value obtained by integrating the power spectral density of the optical signal for transmission in a frequency direction with respect to a signal for transmission is maintained at equal to or greater than the first reference value. Therefore, it is possible to suppress a reduction in the SN ratio of the optical signal for transmission. In addition, in the present embodiment, the peak value of the power spectral density of the optical signal for transmission is set to be equal to or less than the second reference value. Therefore, it is possible to suppress a non-linear optical effect in the light transmission path 30. In this manner, in the present embodiment, it is possible to suppress a deterioration in the optical signal for transmission during its transmission through the light transmission path while suppressing a reduction in the SN ratio of the optical signal for transmission.

Meanwhile, in the filtering unit 120, for example, the amplification factor of the optical signal for transmission at a frequency where the power spectral density of the optical signal for transmission is equal to or greater than a reference value is made to be lower than the amplification factor of the optical signal for transmission at a frequency where the power spectral density is equal to or less than the reference value. In this manner, the filtering unit 120 can set the peak value of the power spectral density of the optical signal for transmission to be equal to or less than the second reference value while maintaining an integrated value obtained by integrating the power spectral density of the optical signal for transmission in a frequency direction at equal to or greater than the first reference value.

In addition, after it is premised that an integrated value obtained by integrating the power spectral density of the optical signal for transmission in a frequency direction is maintained at equal to or greater than the first reference value, it is preferable that the filtering unit 120 perform a filtering process on the driving signal so that the peak value of the power spectral density of the optical signal for transmission is minimized. This causes the suppression effect of a non-linear optical effect to be maximized.

Meanwhile, the filtering unit 120 performs a filtering process on the driving signal. For this reason, the filtering unit 120 includes a digital circuit for performing the above-mentioned filtering process. The filtering unit 120 performs the filtering process using the digital circuit, and thus can perform the filtering process with a high degree of accuracy.

The above-mentioned operations of the filtering unit 120 can be realized by setting a filter coefficient of the filtering unit 120 as follows. First, the light transmission apparatus 10 is prepared. In this case, the filter coefficient of the filtering unit 120 is set to be capable of being changed. Next, the filter coefficient in the filtering unit 120 is adjusted while an integrated value obtained by integrating the power spectral density of the optical signal for transmission in a frequency direction and the peak value of the power spectral density of the optical signal for transmission are measured. Thereby, it is possible to set the peak value to be equal to or less than the second reference value while the integrated value is maintained at equal to or greater than the first reference value.

Meanwhile, the above-mentioned adjustment of the filter coefficient of the filtering unit 120 may be performed after the light transmission apparatus 10 and the light reception apparatus 20 are connected to each other through the light transmission path 30, and may be performed before the light transmission apparatus 10 is connected to the light transmission path 30 (for example, when the light transmission apparatus 10 is shipped or is introduced into a field site).

Second Embodiment

Figure 2:
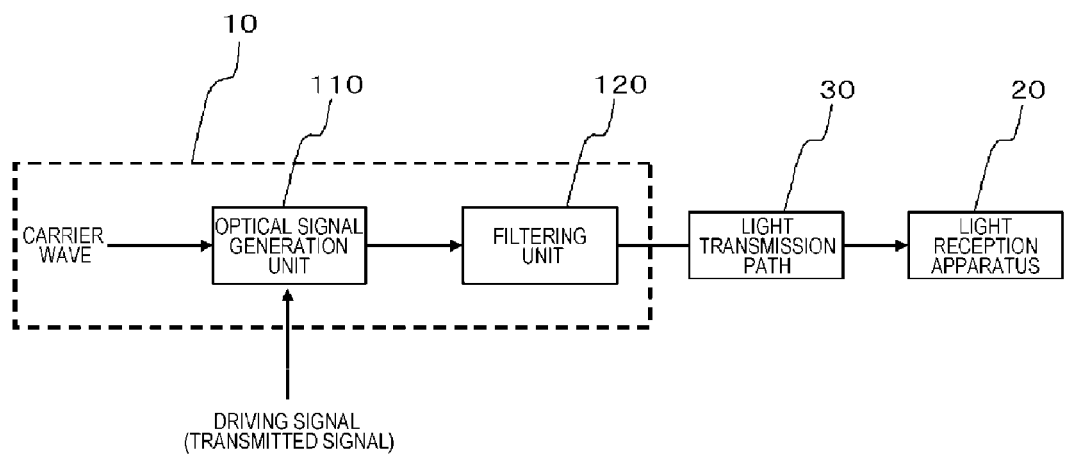
FIG. 2 is a diagram illustrating a configuration of a light transmission apparatus according to a second embodiment together with the environment of its use.

FIG. 2 is a diagram illustrating a configuration of a light transmission apparatus 10 according to a second embodiment together with the environment of its use. The light transmission apparatus 10 according to the present embodiment has the same configuration as that of the first embodiment, except for the function of the filtering unit 120. In the present embodiment, the filtering unit 120 performs a filtering process on the optical signal for transmission, and thus sets the peak value of the power spectral density of the optical signal for transmission to be equal to or less than the second reference value while maintaining an integrated value obtained by integrating the power spectral density of the optical signal for transmission in a frequency direction at equal to or greater than the first reference value.

In the present embodiment, the filtering unit 120 performs a filtering process on the optical signal for transmission. For this reason, the filtering unit 120 performs the above-mentioned filtering process using an optical filter rather than a digital circuit.

In the present embodiment, it is also possible to obtain the same effect as that of the first embodiment.

Third Embodiment

Figure 3:
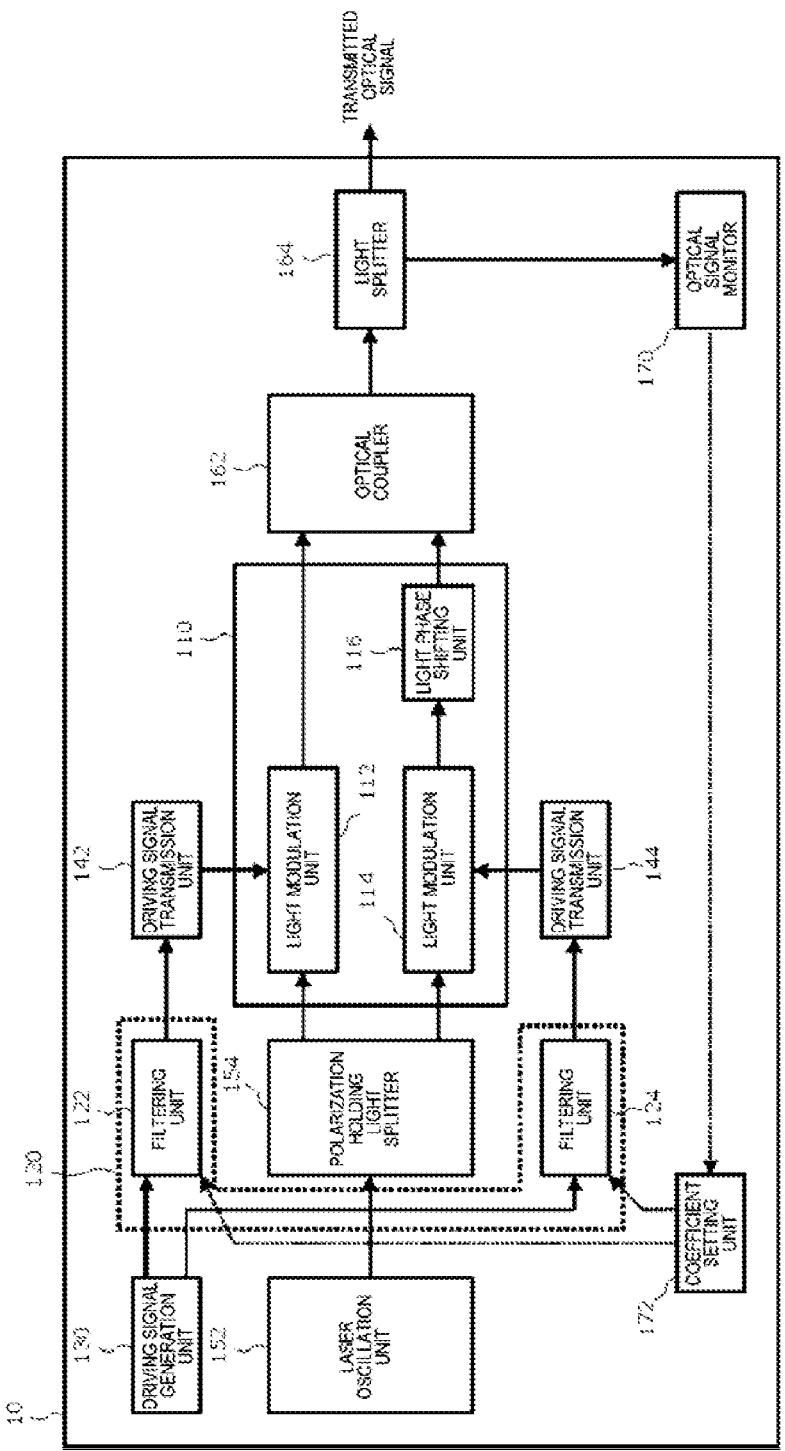
FIG. 3 is a diagram illustrating a configuration of a light transmission apparatus according to a third embodiment.

FIG. 3 is a diagram illustrating a configuration of a light transmission apparatus 10 according to a third embodiment. The light transmission apparatus 10 according to the present embodiment includes light modulation units 112 and 114, a light phase shifting unit 116, filtering units 122 and 124, a driving signal generation unit 130, driving signal transmission units 142 and 144, an optical coupler 162, a laser oscillation unit 152, and a polarization holding light splitter 154. The light modulation units 112 and 114 constitute the optical signal generation unit 110, and the filtering units 122 and 124 constitute the filtering unit 120.

The laser oscillation unit 152 oscillates a laser beam serving as a carrier wave. The polarization holding light splitter 154 branches the laser beam generated by the laser oscillation unit 152 into two beams, and inputs the branched beams to the light modulation unit 112 and the light modulation unit 114.

The driving signal generation unit 130 generates two driving signals based on a signal to be transmitted.

The filtering unit 122 performs a filtering process on one of the driving signals generated by the driving signal generation unit 130. The filtering unit 124 performs a filtering process on the remaining driving signal generated by the driving signal generation unit 130. The filtering process performed by the filtering unit 122 and the filtering process performed by the filtering unit 124 are the same as the process performed by the filtering unit 120 in the first embodiment. Filter coefficients which are used by the filtering unit 122 and the filtering unit 124 may be equal to each other, and may be different from each other.

The light modulation unit 112 modulates the laser beam in accordance with the driving signal after being processed by the filtering unit 122 and generates an optical signal (first optical signal). The light modulation unit 114 modulates the laser beam in accordance with the driving signal after processed by the filtering unit 124 and generates an optical signal (second optical signal).

The light phase shifting unit 116 changes the phase of the optical signal, by $\pi/2$, which is generated by the light modulation unit 114. The optical coupler 162 multiplexes the optical signal generated by the light modulation unit 112 and the optical signal generated by the light modulation unit 114 to generate the optical signal for transmission. This optical signal for transmission is transmitted to the light reception apparatus 20 through the light transmission path 30.

The light transmission apparatus 10 according to the present embodiment further includes a light splitter 164, an optical signal monitor 170, and a coefficient setting unit 172. The light splitter 164 branches the optical signal for transmission which is output by the optical coupler 162 and outputs the branched optical signal to the optical signal monitor 170. The optical signal monitor 170 measures an integrated value obtained by integrating the optical signal for transmission in a frequency direction and the peak value of the power spectral density of the optical signal for transmission. The optical signal monitor 170 uses, for example, an optical spectrum analyzer or a spectral analysis through a Fourier transformation process of signal light, to thereby determine the integrated value and the peak value which are mentioned above. Measurement results of the optical signal monitor 170 are output to the coefficient setting unit 172. The coefficient setting unit 172 adjusts the filter coefficients of the filtering units 122 and 124 on the basis of the measurement results of the optical signal monitor 170. Thereby, the coefficient setting unit 172 sets the above-mentioned peak value to be equal to or less than the second reference value while maintaining the above-mentioned integrated value at equal to or greater than the first reference value. The coefficient setting unit 172 sets the band of signal light used in the calculation of the filter coefficients to be twice, for example, the symbol rate of the signal light. However, the coefficient setting unit 172 may select such a band that the integrated value of the power spectrum for an average power spectral density of the signal light is set to be equal to or greater than a predetermined ratio (for example, 90% or the like).

As stated above, in the present embodiment, it is also possible to obtain the same effect as that of the first embodiment. In addition, since the optical signal monitor 170 and the coefficient setting unit 172 are included, it is possible to easily set the filter coefficient of the filtering unit 120. Meanwhile, the coefficient setting unit 172 is not required to be brought into operation at all times, and may operate, for example, only when the light transmission path 30 is changed. In addition, the coefficient setting unit 172 is not required to be installed within the light transmission apparatus 10 at all times, and may be detached from the light transmission apparatus 10 while the correction of the filter coefficient is not performed.

Fourth Embodiment

Figure 4:
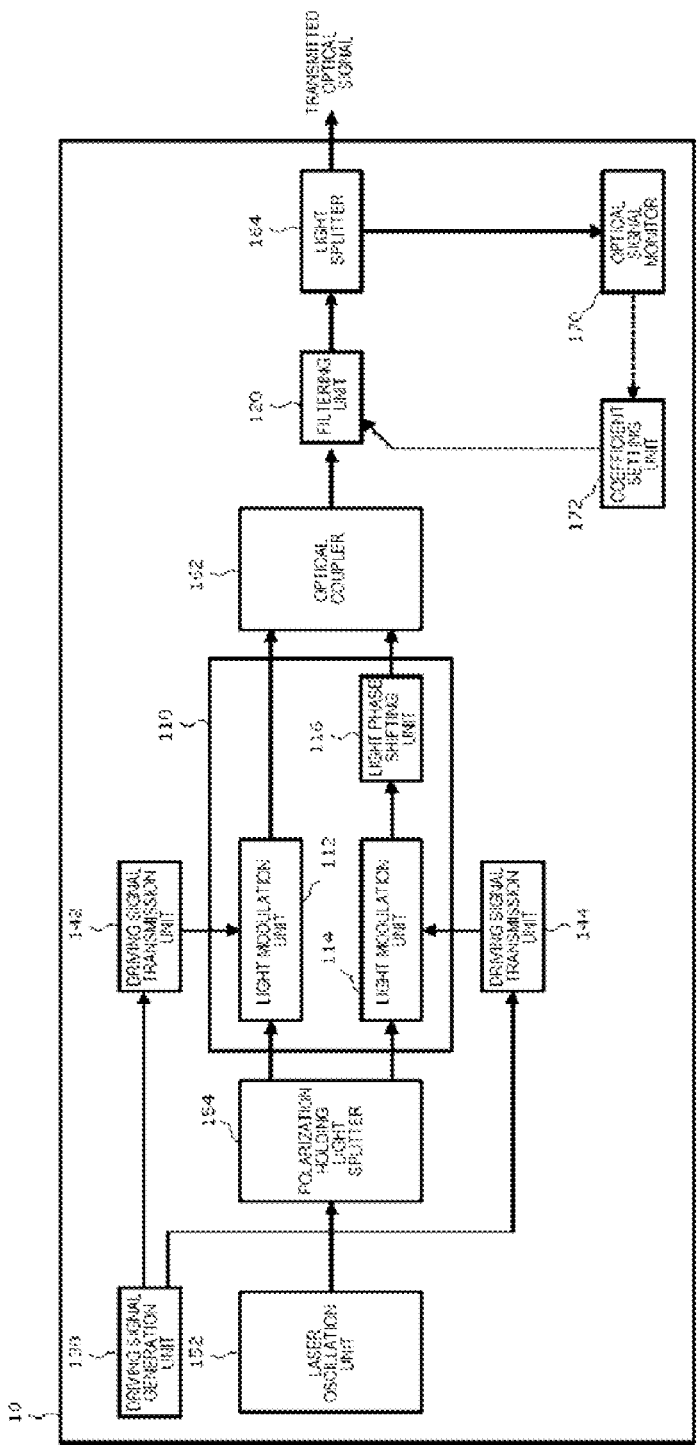
FIG. 4 is a diagram illustrating a configuration of a light transmission apparatus according to a fourth embodiment.

FIG. 4 is a diagram illustrating a configuration of a light transmission apparatus 10 according to a fourth embodiment. The light transmission apparatus 10 according to the present embodiment has the same configuration as the light transmission apparatus 10 according to the third embodiment, except that the position and function of the filtering unit 120 are the same as those in the second embodiment.

In the present embodiment, it is also possible to obtain the same effect as that of the third embodiment.

Fifth Embodiment

Figure 5:
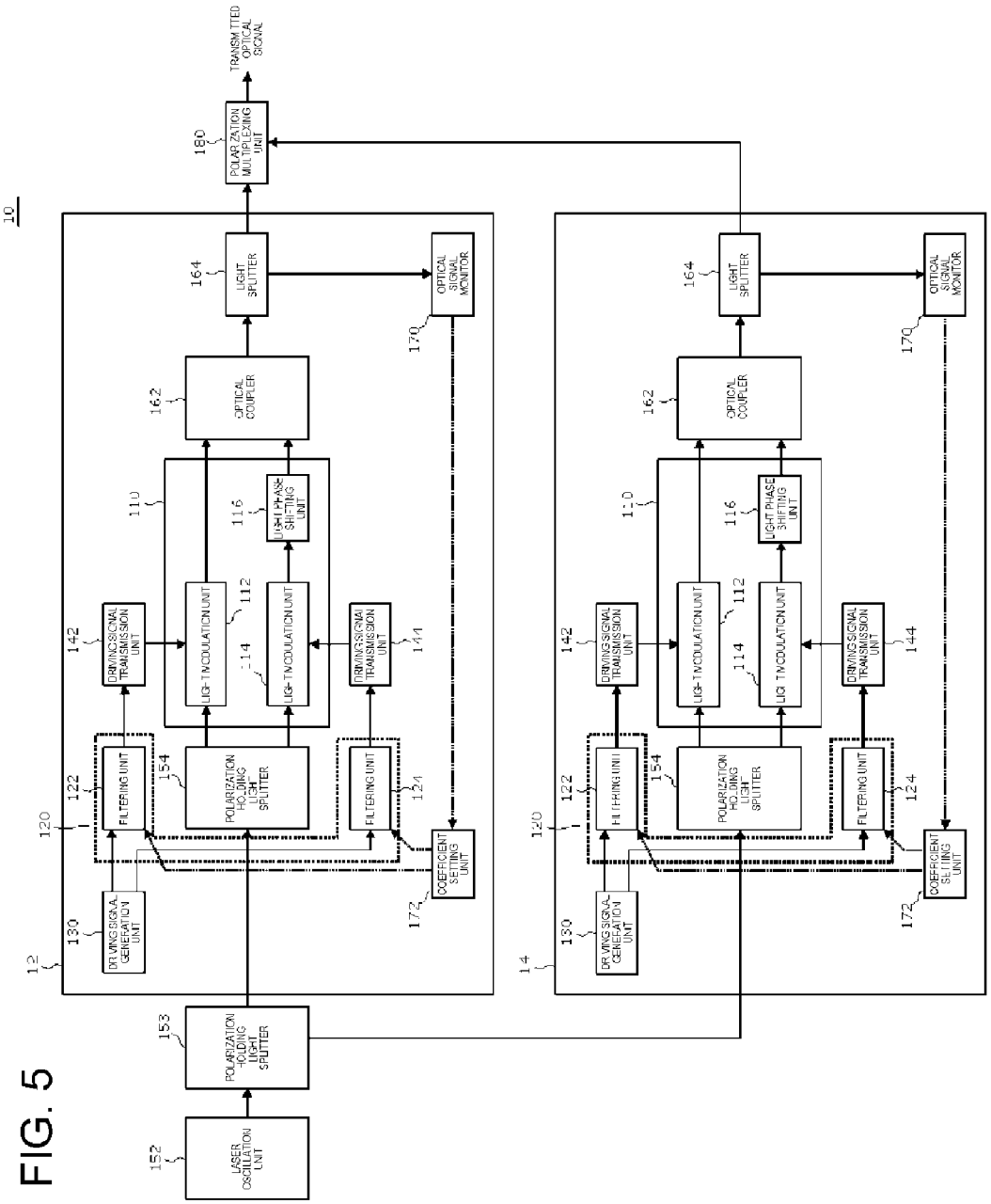
FIG. 5 is a diagram illustrating a configuration of a light transmission apparatus according to a fifth embodiment.

FIG. 5 is a diagram illustrating a configuration of a light transmission apparatus 10 according to a fifth embodiment. The light transmission apparatus 10 according to the present embodiment transmits an optical signal using a polarization multiplexing system. The light transmission apparatus 10 includes light transmission units 12 and 14. The basic configuration of each of the light transmission units 12 and 14 is the same as any of the light transmission units 12 of the first to fourth embodiments. The drawing shows a case similar to that in the third embodiment.

Specifically, in each of the light transmission units 12 and 14, each functional unit performs the following process. First, the driving signal generation unit 130, the filtering unit 122, and the driving signal transmission unit 142 generate a driving signal corresponding to an I phase. The driving signal generation unit 130, the filtering unit 124, and the driving signal transmission unit 144 generate a driving signal corresponding to a Q phase. Both driving signals which are output from the driving signal transmission units 142 and 144 are input to the light modulation unit 112. In the present embodiment, the light modulation unit 112 is an optical I/Q modulator.

Each of the light transmission units 12 and 14 includes the light splitter 164, the optical signal monitor 170, and the coefficient setting unit 172. That is, in the present embodiment, each of the light transmission units 12 and 14 individually sets the filter coefficient of the filtering unit 120.

Meanwhile, the light transmission units 12 and 14 may share the coefficient setting unit 172. In this case, the same filter coefficient is set in the filtering unit 120 of the light transmission unit 12 and the filtering unit 120 of the light transmission unit 14. In this case, the light splitter 164 and the optical signal monitor 170 may be provided in each of the light transmission units 12 and 14, and only any one of them may be provided therein.

In addition, the light transmission apparatus 10 includes a polarization multiplexing unit 180. The polarization multiplexing unit 180 multiplexes the optical signal (first optical signal) generated by the light transmission unit 12 and the optical signal (second optical signal) generated by the light transmission unit 14 in a state where mutual deflection states are orthogonal to each other, to thereby generate an optical signal for transmission.

Meanwhile, the light transmission units 12 and 14 share one laser oscillation unit 152 as a light source of a carrier wave. A carrier wave which is output from the laser oscillation unit 152 is incident on the polarization holding light splitter 154 of each of the light transmission units 12 and 14 through a polarization holding light splitter 153.

Figure 6:
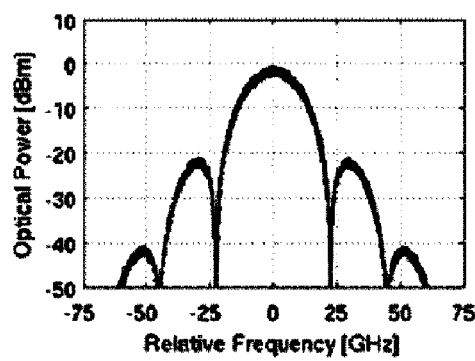
FIG. 6 is a diagram illustrating an effect of a filtering process of a filtering unit.
Figure 6:
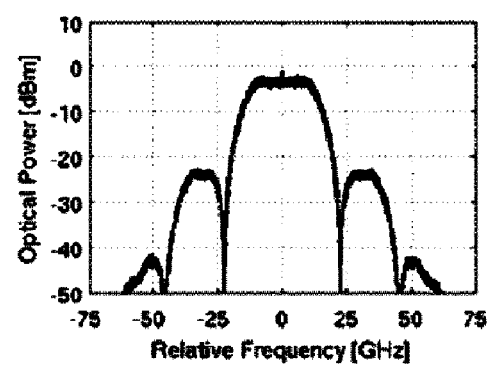

FIG. 6(a) shows an example of an optical signal for transmission when the filtering unit 120 does not perform a filtering process. In this example, the optical signal for transmission is an optical signal of a polarization multiplexing return-to-zero quadrature phase shift keying (RZ-QPSK) system, and has, for example, a baud rate of 12.5 Gbaud and a bit rate of 50 Gbps. On the other hand, the filtering unit 120 performs a filtering process using a filter coefficient shown in FIG. 7. Then, as shown in FIG. 6(b), the power spectral density of the optical signal for transmission becomes lower in the vicinity of a carrier wave frequency. In the example shown in FIG. 6(b), the power spectral density of the optical signal for transmission becomes appropriately uniform in the vicinity of the carrier wave frequency. On the other hand, the power spectral density of the optical signal for transmission at a position away from the carrier wave frequency becomes higher. As a result, an integrated value obtained by integrating the power spectral density of the optical signal for transmission in a frequency direction is maintained at equal to or greater than the first reference value.

Figure 7:
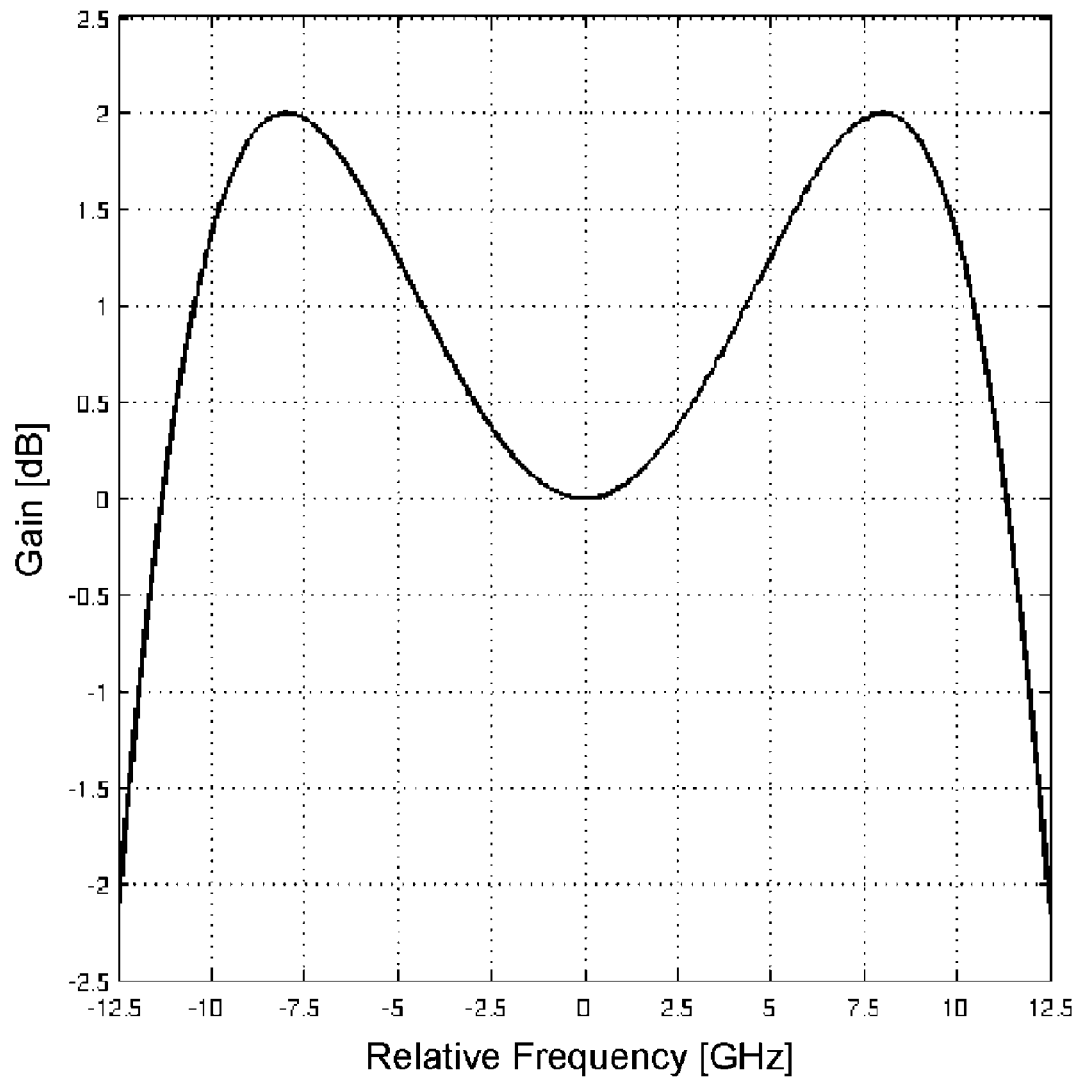
FIG. 7 is a diagram illustrating an effect of the filtering process of the filtering unit.

Meanwhile, the filter coefficient shown in FIG. 7 is an example. A band at which the power spectral density becomes uniform has an optimum range depending on the light spectrum of the optical signal for transmission, actual transmission characteristics or the like. For this reason, the filter coefficient is also required to be determined depending on the light spectrum, the actual transmission characteristics or the like. Meanwhile, the light spectrum is determined by parameters such as a baud rate, a modulation system and the like.

Figure 8:
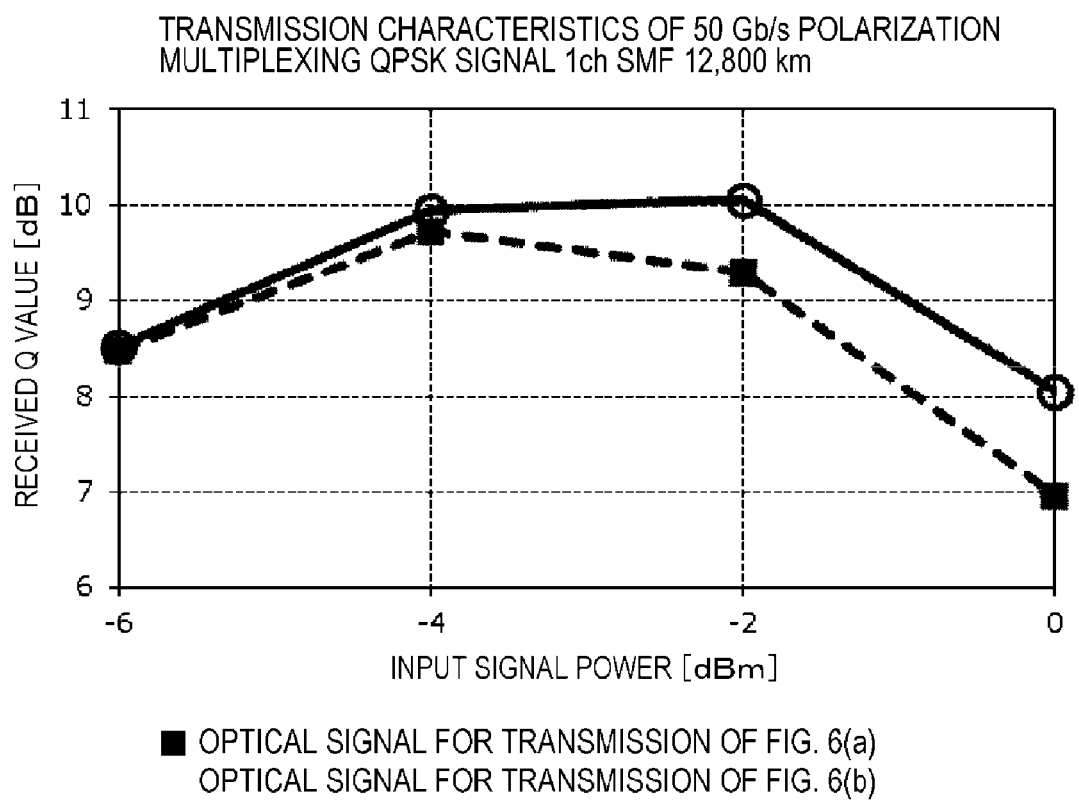
FIG. 8 is a diagram illustrating an effect of the filtering process of the filtering unit.

FIG. 8 shows transmission simulation results in each of a case where the optical signal for transmission shown in FIG. 6(a) is used and a case where the optical signal for transmission shown in FIG. 6(b) is used. It is assumed that 160 spans of a single-mode fiber (SMF) having a span length of 80 km is used as the light transmission path 30. That is, the length of the light transmission path 30 is set to 12,800 km.

The horizontal axis is span input power per channel, and the vertical axis is a received Q value. From the drawings, it can be understood that the optical signal for transmission (FIG. 6(b)) processed by the filtering unit 120 has a further improvement in the received Q value than an optical signal for transmission which is not processed by the filtering unit 120. It is considered that this effect is caused by a reduction in the peak value of the power spectral density of the optical signal for transmission.

According to the present exemplary embodiment, in the light transmission apparatus 10 of a polarization multiplexing system, it is also possible to obtain the same effect as those of the first to fourth exemplary embodiments.

Sixth Exemplary Embodiment

Figure 9:
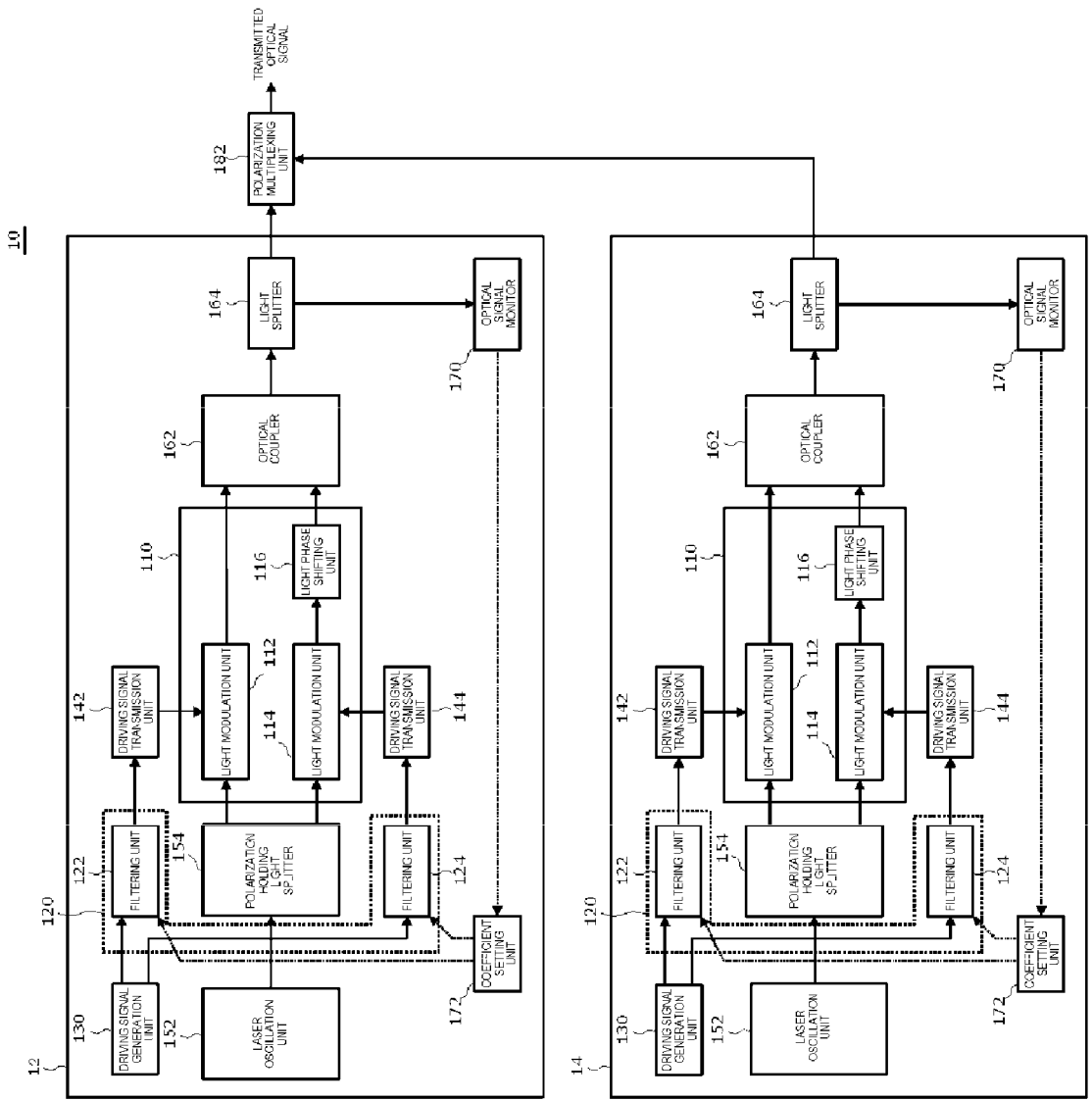
FIG. 9 is a diagram illustrating a configuration of a light transmission apparatus according to a sixth embodiment.

FIG. 9 is a diagram illustrating a configuration of a light transmission apparatus 10 according to a sixth exemplary embodiment. The light transmission apparatus 10 according to the present exemplary embodiment multiplexes an optical signal using wavelength division multiplexing (WDM).

Specifically, the light transmission apparatus 10 includes the light transmission units 12 and 14. The light transmission units 12 and 14 have the same configurations as the light transmission units 12 and 14 according to the fifth exemplary embodiment, except that each of them includes the laser oscillation unit 152. The laser oscillation unit 152 of the light transmission unit 12 is different from the laser oscillation unit 152 of the light transmission unit 14 in oscillation frequency.

Further, the light transmission apparatus 10 includes a wavelength multiplexing unit 182. The wavelength multiplexing unit 182 multiplexes an optical signal (first optical signal for transmission) generated by the light transmission unit 12 and an optical signal (second optical signal for transmission) generated by the light transmission unit 14 to thereby output the multiplexed optical signals.

According to the present embodiment, in the light transmission apparatus 10 of wavelength division multiplexing, it is also possible to obtain the same effect as those of the first to fourth embodiment. In addition, since cross phase modulation (XPM) can be reduced between each channel, the transmission characteristics of each channel can also be improved.

Seventh Embodiment

Figure 10:
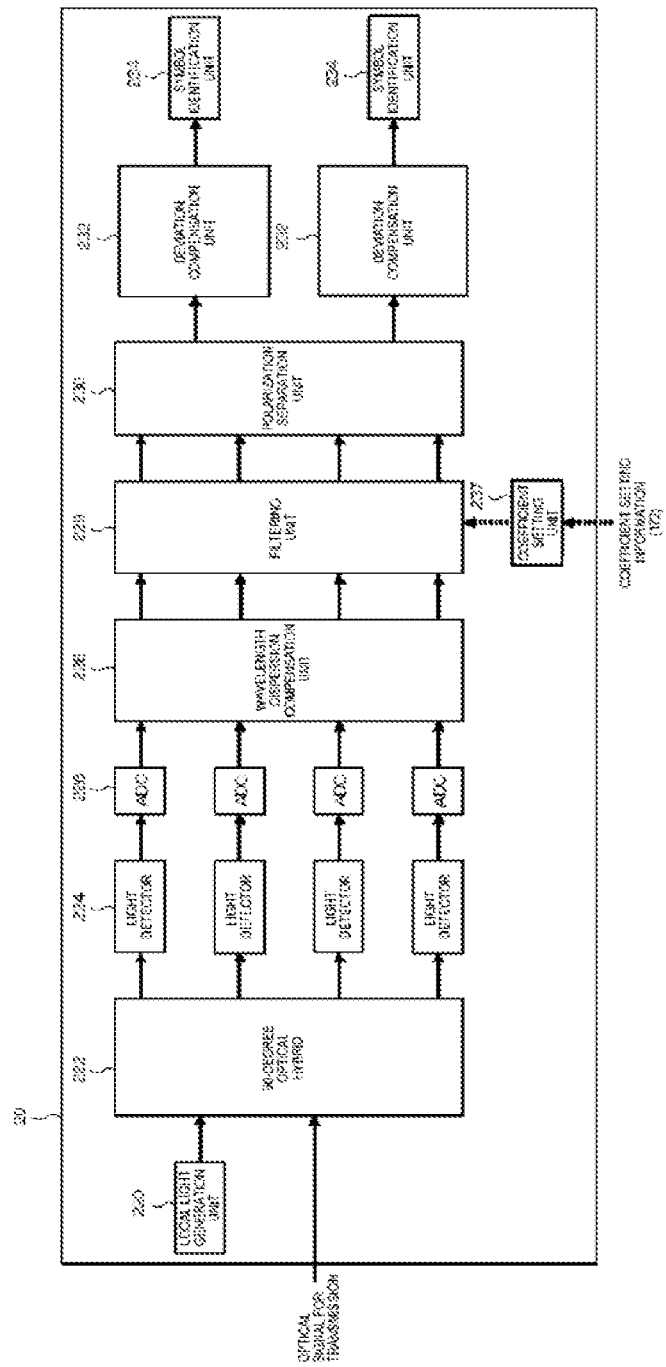
FIG. 10 is a diagram illustrating a functional configuration of a light reception apparatus according to a seventh embodiment.

FIG. 10 is a diagram illustrating a functional configuration of a light reception apparatus 20 according to a seventh embodiment. The light reception apparatus 20 according to the present embodiment is used together with the light transmission apparatus 10 according to the fifth embodiment. That is, the light reception apparatus 20 receives and processes an optical signal of a polarization multiplexing system.

Specifically, the light reception apparatus 20 includes a local light generation unit 220, a 90-degree optical hybrid 222, a light detector 224, an analog to digital (AD) converter 226, a wavelength dispersion compensation unit 228, a filtering unit 229 (second filtering unit), a polarization separation unit 230, a deviation compensation unit 232, a symbol identification unit 234, and a coefficient setting unit 237.

The local light generation unit 220 oscillates local light. The local light has substantially the same frequency as a carrier wave.

The optical signal for transmission and the local light from the local light generation unit 220 are input to the 90-degree optical hybrid 222. The 90-degree optical hybrid 222 causes the optical signal and the local light to interfere with each other with a phase difference 0 to generate an optical signal ($I_x$), and causes the optical signal and the local light to interfere with each other with a phase difference $\pi/2$ to generate an optical signal ($Q_x$). In addition, the 90-degree optical hybrid 222 causes the optical signal and the local light to interfere with each other with the phase difference 0 to generate an optical signal ($I_y$), and causes the optical signal and the local light to interfere with each other with the phase difference $\pi/2$ to generate an optical signal ($Q_y$).

The light detector 224 photoelectrically converts four optical signals ($I_x$, $Q_x$, $I_y$, and $Q_y$) generated by the 90-degree optical hybrid 222, and generates four analog signals.

The AD converter 226 converts the four analog signals generated by the light detector 224 into digital signals, respectively.

The wavelength dispersion compensation unit 228 performs a process of compensating for wavelength dispersion added to the optical signal for transmission in the light transmission path 30, on the four digital signals generated by the AD converter 226.

The filtering unit 229 performs a filtering process on the four digital signals, and compensates for a process performed by the filtering unit 120. Specifically, the product of the representation of a filter coefficient (second filter coefficient), set in the filtering unit 229, on a frequency domain and the representation of a filter coefficient (first filter coefficient), set in the filtering unit 120, on a frequency domain is set to 1 at all the frequencies. In other words, in the filtering unit 229 and the filtering unit 120, results of the convolution of the representations of mutual filter coefficients on time domains are impulses.

Meanwhile, the filter coefficient of the filtering unit 229 is set by the coefficient setting unit 237. The coefficient setting unit 237 receives coefficient setting information for determining the filter coefficient of the filtering unit 229, and sets the filter coefficient of the filtering unit 229 on the basis of the received coefficient setting information. The coefficient setting information is, for example, a filter coefficient of the filtering unit 120. In this case, the coefficient setting unit 237 may receive the filter coefficient of the filtering unit 120 from the coefficient setting unit 172 of the light transmission apparatus 10, and may receive the filter coefficient of the filtering unit 120 through a recording medium. Meanwhile, the coefficient setting information may be the filter coefficient itself to be set in the filtering unit 229.

The polarization separation unit 230 generates a signal indicating transmitted information using four digital signals. Specifically, the polarization separation unit 230 generates 2-channel signals $E_{xin}(t)=Ix+jQx$ and $E_{yin}(t)=I_y+jQy$ using signals Ix, Qx, Iy, and Qy which are output by the wavelength dispersion compensation unit 228. $E_{xin}(t)$ indicates a signal transmitted by the light transmission unit 12 of FIG. 7, and $E_{yin}(t)$ indicates a signal transmitted by the light transmission unit 14 of FIG. 7.

The deviation compensation unit 232 compensates for frequency deviation and optical phase deviation between the optical signal for transmission and the local light. Thereby, noise of a signal caused by the rotation of an optical phase is compensated for. The symbol identification unit 234 performs a symbol determination using a signal which is compensated for by the deviation compensation unit 232. Thereby, the transmitted signal is demodulated.

Specifically, two sets of deviation compensation units 232 and symbol identification units 234 are provided. A first set of deviation compensation unit 232 and symbol identification unit 234 processes $E_{xin}(t)$. A second set of deviation compensation unit 232 and symbol identification unit 234 processes $E_{yin}(t)$.

In the present embodiment, it is also possible to obtain the same effect as that of the fifth embodiment. In addition, the filtering process performed by the filtering unit 120 is compensated for by the filtering unit 229, and thus the filtering unit 120 can prevent a signal from being deteriorated.

Meanwhile, in the first to fourth embodiments, the light reception apparatus 20 which is used together with the light transmission apparatus 10 may be provided with the filtering unit 229. In this case, it is also possible to obtain the same effect as that of the present embodiment.

Eighth Embodiment

Figure 11:
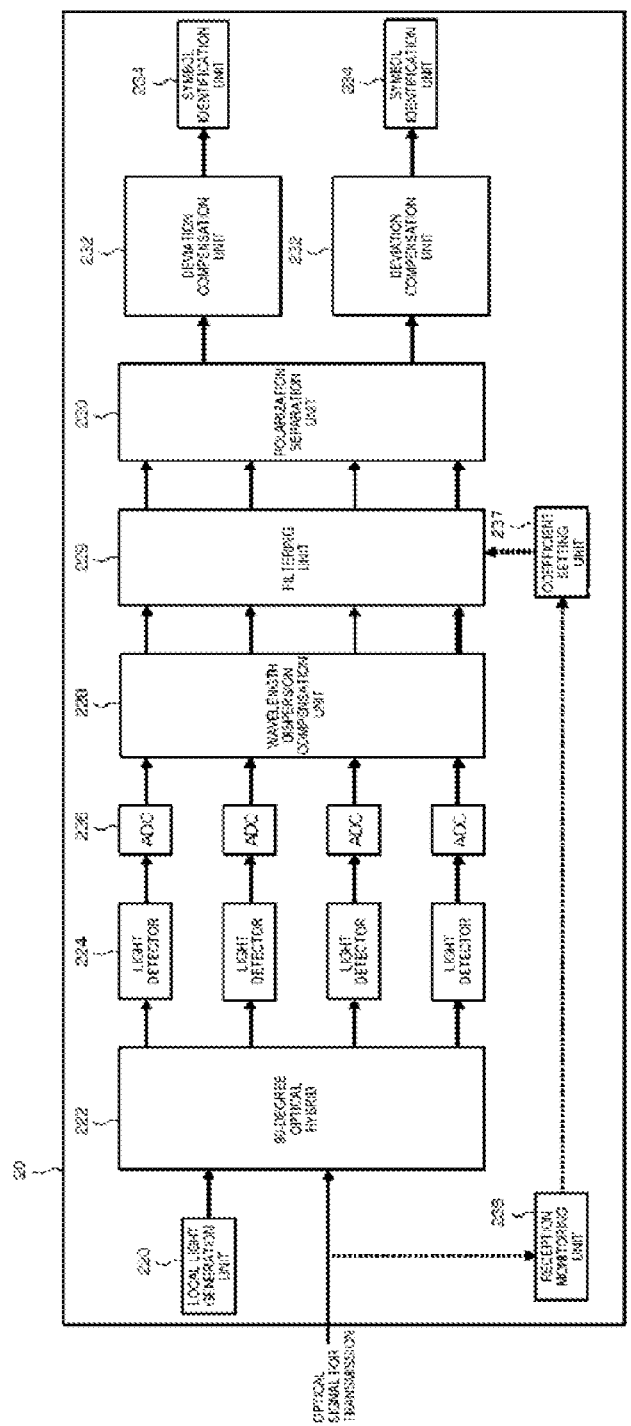
FIG. 11 is a diagram illustrating a configuration of a light reception apparatus according to an eighth embodiment.

FIG. 11 is a diagram illustrating a configuration of a light reception apparatus 20 according to an eighth embodiment. The light reception apparatus 20 according to the present embodiment has the same configuration as the light reception apparatus 20 according to the seventh embodiment, except for the following points.

First, the light reception apparatus 20 includes a reception monitoring unit 238. The reception monitoring unit 238 monitors the quality of the light spectrum of the received optical signal for transmission. In the example shown in the drawing, the reception monitoring unit 238 determines the quality of the optical signal for transmission before being input to the 90-degree optical hybrid 222. However, the monitoring point of the reception monitoring unit 238 is not limited to the example shown in the drawing. The coefficient setting unit 237 sets the filter coefficient of the filtering unit 229 on the basis of the determination result of the reception monitoring unit 238. Specifically, the coefficient setting unit 237 sets the filter coefficient of the filtering unit 229 so that the spectrum of the optical signal for transmission becomes an ideal spectrum. Here, the ideal spectrum is, for example, a spectrum of the optical signal for transmission immediately after being output from the light transmission apparatus 10 when the filtering unit 120 does not perform a filtering process.

In the present embodiment, since the filtering process performed by the filtering unit 120 is compensated for by the filtering unit 229, the filtering unit 120 can also prevent a signal from being deteriorated. In addition, the filtering unit 229 is not required to acquire information from the outside.

Ninth Embodiment

Figure 12:
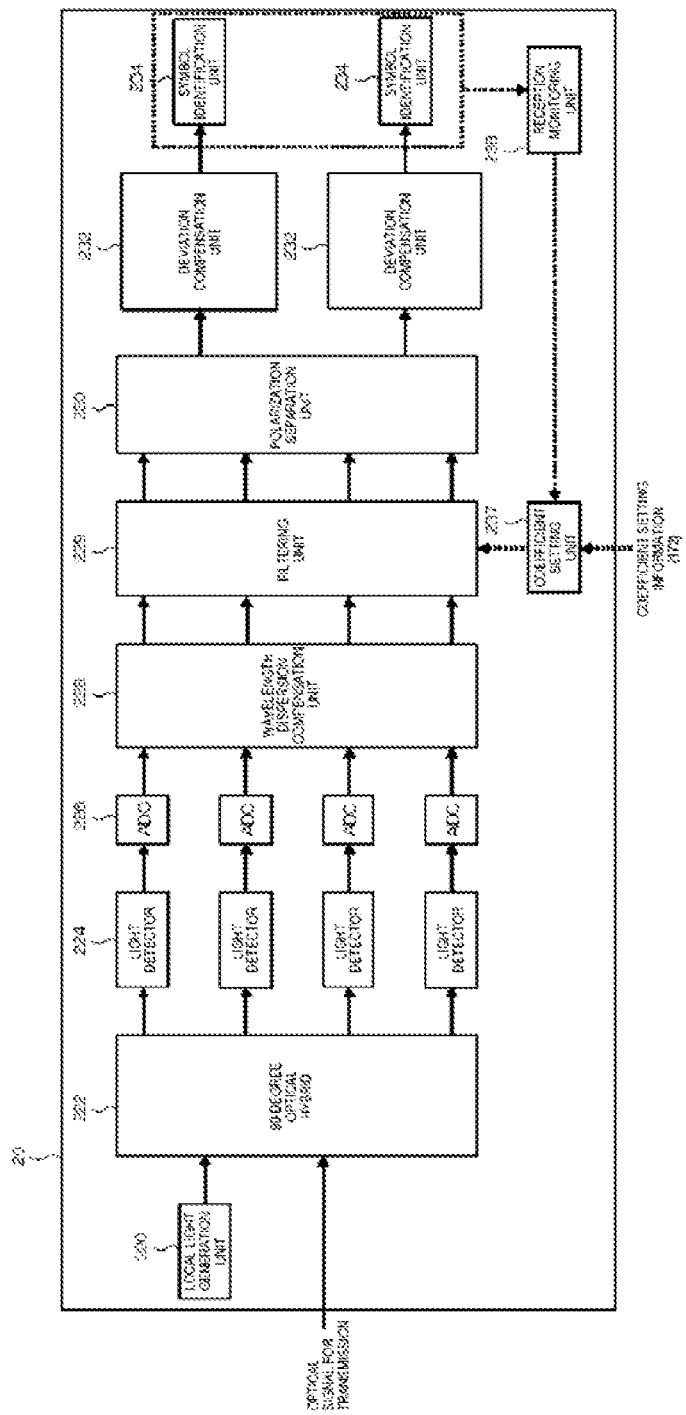
FIG. 12 is a diagram illustrating a configuration of a light reception apparatus according to a ninth embodiment.

FIG. 12 is a diagram illustrating a configuration of a light reception apparatus 20 according to a ninth embodiment. The light reception apparatus 20 according to the present embodiment has the same configuration as the light reception apparatus 20 according to the eighth embodiment, except for the function of the reception monitoring unit 238.

In the present embodiment, the reception monitoring unit 238 monitors the quality of a signal indicating the optical signal for transmission. Specifically, the reception monitoring unit 238 receives information using the symbol determination result of the symbol identification unit 234, and calculates a deviation from an ideal symbol point, a received Q value, a bit error, and the like as signal quality information. The coefficient setting unit 237 sets the filter coefficient used by the filtering unit 229 so as to compensate for these information items. The coefficient setting unit 237 calculates the filter coefficient using, for example, a constant modulus algorithm (CMA).

In the present embodiment, a deterioration in signal quality is also compensated for by the filtering unit 229. Therefore, it is possible to prevent the received signal quality from being deteriorated.

Tenth Embodiment

Figure 13:
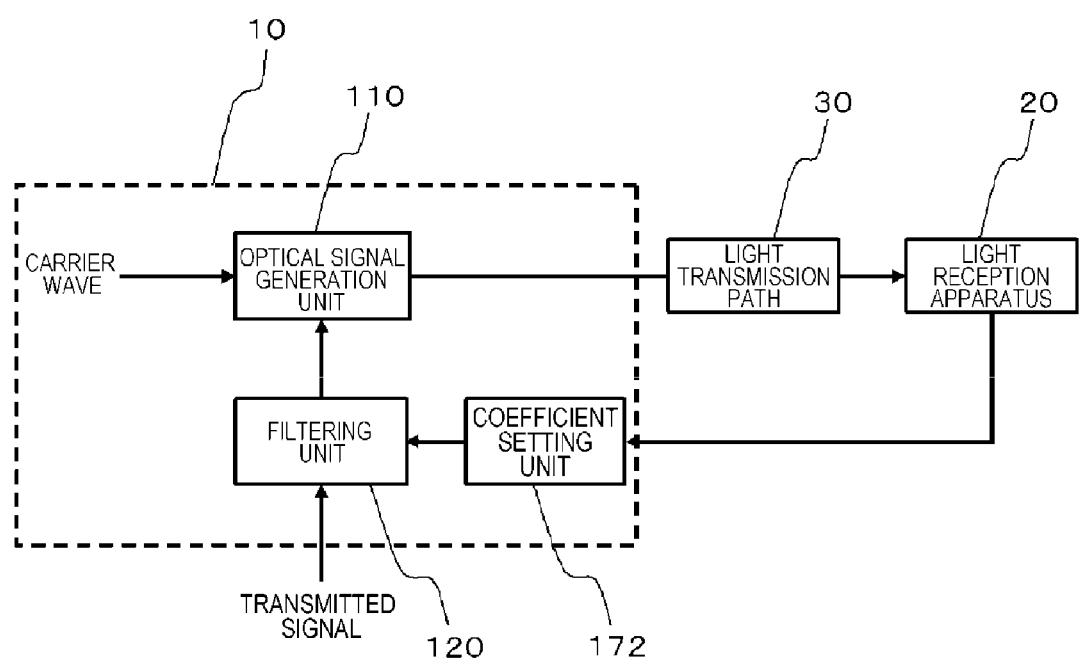
FIG. 13 is a diagram illustrating a configuration of a light communication system according to a tenth embodiment.

FIG. 13 is a diagram illustrating a configuration of a light communication system according to tenth embodiment. In the light communication system according to the present embodiment, the light transmission apparatus 10 is the same as those in any of the first to sixth embodiments, except for the following points. In addition, the light reception apparatus 20 is the same as those in any of the seventh to ninth embodiments, except for the following points.

First, the optical signal for transmission is subject to band constriction due to a wavelength demultiplexing device, an optical filter or the like which is disposed within the light transmission path 30, during transmission through the light transmission path 30. The light reception apparatus 20 analyzes the received optical signal for transmission, generates information indicating the band constriction caused by the light transmission path 30, and transmits the information to the light transmission apparatus 10.

The light transmission apparatus 10 includes the coefficient setting unit 172. The coefficient setting unit 172 sets a filter coefficient so that the peak value of the power spectral density of the optical signal for transmission is set to be equal to or less than the second reference value while an integrated value obtained by integrating the power spectral density of the optical signal for transmission in a frequency direction is maintained at equal to or greater than the first reference value. In this case, the coefficient setting unit 172 corrects (multiplies) the filter coefficient so as to compensate for the band constriction (for example, by being provided with the function of a high-pass filter), in consideration of the information, indicating the band constriction, received from the light reception apparatus 20.

In the present embodiment, it is also possible to obtain the same effect as those of the first to ninth embodiments. In addition, the filtering unit 120 performs a filtering process so as to compensate for the influence of the band constriction within the light transmission path 30 by the optical signal for transmission. Therefore, it is possible to further prevent the quality of a signal received by the light reception apparatus 20 from being deteriorated.

As described above, although the embodiments of the invention have been set forthwith reference to the drawings, they are merely illustrative of the invention, and various configurations other than those stated above can be adopted.

This application claims priority from Japanese Application No. 2012-89622 filed on Apr. 10, 2012, the content of which is incorporated herein by reference in its entirety.

What is claimed is:

1. A light transmission apparatus comprising:
an optical signal generation unit that generates an optical signal for transmission by adding modulation based on a driving signal to a carrier wave; and
a filtering unit that performs a filtering process on the optical signal for transmission or the driving signal,
wherein the filtering unit sets a peak value of a power spectral density of the optical signal for transmission to be equal to or less than a second reference value while maintaining an integrated value obtained by integrating the power spectral density of the optical signal for transmission in a frequency direction at equal to or greater than a first reference value.

2. The light transmission apparatus according to claim 1, wherein the filtering unit makes an amplification factor of the optical signal for transmission at a frequency where the power spectral density is equal to or greater than the first reference value to be lower than an amplification factor of the optical signal for transmission at a frequency where the power spectral density is equal to or less than the first reference value.

3. The light transmission apparatus according to claim 1, wherein a filter coefficient used by the filtering unit is set so that the peak value of the power spectral density is minimized.

4. The light transmission apparatus according to claim 1, further comprising:
   a first optical signal generation unit that generates a first optical signal on the basis of a first driving signal;
   a second optical signal generation unit that generates a second optical signal which is orthogonal to the first optical signal in a polarization state and has the same frequency band of a carrier wave, on the basis of a second driving signal; and
   a first multiplexing unit that multiplexes the first optical signal and the second optical signal to generate the optical signal for transmission,
wherein the filtering unit performs a filtering process on the first driving signal and the second driving signal, or the optical signal for transmission.

5. The light transmission apparatus according to claim 1, further comprising:
   a first optical signal generation unit that generates a first optical signal for transmission using a first carrier wave;
   a first filtering unit that performs the filtering process on the first optical signal for transmission;
   a second optical signal generation unit that generates a second optical signal for transmission using a second carrier wave which is different from the first carrier wave in frequency;
   a second filtering unit that performs the filtering process on the second optical signal for transmission; and
   a second multiplexing unit that multiplexes the first optical signal for transmission and the second optical signal for transmission.

6. The light transmission apparatus according to claim 1, wherein the filtering unit further compensates for band constriction in a light transmission path until the optical signal for transmission reaches a light reception apparatus.

7. A light transmission apparatus comprising:
   an optical signal generation unit that generates an optical signal for transmission by adding modulation based on a driving signal to a carrier wave; and
   a filtering unit that performs a filtering process on the optical signal for transmission or the driving signal,
wherein the filtering unit makes an amplification factor of the optical signal for transmission at a frequency where a power spectral density is equal to or greater than a reference value to be lower than an amplification factor of the optical signal for transmission at a frequency where the power spectral density is equal to or less than the reference value.

8. A light communication system comprising:
   a light transmission apparatus that transmits an optical signal for transmission; and
   a light reception apparatus that receives the optical signal for transmission,
   wherein the light transmission apparatus includes
   an optical signal generation unit that generates an optical signal for transmission by adding modulation based on a driving signal to a carrier wave, and
   a first filtering unit that performs a filtering process on the optical signal for transmission or the driving signal, using a first filter coefficient, and
   the filtering unit sets a peak value of a power spectral density of the optical signal for transmission to be equal to or less than a second reference value while maintaining an integrated value obtained by integrating the power spectral density of the optical signal for transmission in a frequency direction at equal to or greater than a first reference value.

9. The light communication system according to claim 8, wherein the light reception apparatus includes:
   a second filtering unit that performs a filtering process on a signal indicated by the optical signal for transmission; and
   a coefficient setting unit that receives coefficient setting information for setting a second filter coefficient for compensating for the first filtering unit, and sets the second filter coefficient on the basis of the received coefficient setting information.

10. The light communication system according to claim 9, wherein the coefficient setting information is the first filter coefficient.

11. The light communication system according to claim 8, wherein the light reception apparatus includes:
   a second filtering unit that performs a filtering process on a signal indicated by the optical signal for transmission, using a second filter coefficient;
   a reception monitoring unit that monitors a light spectrum of the received optical signal for transmission, or quality of a signal indicated by the optical signal for transmission; and
   a coefficient setting unit that sets the second filter coefficient on the basis of a monitoring result of the reception monitoring unit.

12. A light reception apparatus comprising a compensation unit that performs a filtering process on a signal which is generated on the basis of an optical signal for transmission transmitted from a light transmission apparatus,
   wherein the optical signal for transmission is added with a first process in which a peak value of a power spectral density of the optical signal for transmission is set to be equal to or less than a second reference value while an integrated value obtained by integrating the power spectral density of the optical signal for transmission in a frequency direction is maintained at equal to or greater than a first reference value, and
   the compensation unit performs a second process of compensating for the first process.

13. A method for adjusting a light transmission apparatus comprising:
   preparing a light transmission apparatus which is provided with an optical signal generation unit that generates an optical signal for transmission by adding modulation based on a driving signal to a carrier wave and a filtering unit that performs a filtering process on the optical signal for transmission or the driving signal; and
   adjusting a filter coefficient in the filtering unit while measuring an integrated value obtained by integrating a power spectral density of the optical signal for transmission in a frequency direction, and a peak value of the power spectral density of the optical signal for transmission, to set the peak value to be equal to or less than a second reference value while maintaining the integrated value at equal to or greater than a first reference value.

14. The method for adjusting a light transmission apparatus according to claim 13, wherein the filter coefficient is adjusted so that an amplification factor of the optical signal for transmission at a frequency where the power spectral density is equal to or greater than a reference value becomes lower than an amplification factor of the optical signal for transmission at a frequency where the power spectral density is equal to or less than the reference value.

15. The method for adjusting a light transmission apparatus according to claim 13, wherein the filter coefficient is set so that the peak value is minimized.

16. A method for transmitting light comprising:
generating an optical signal for transmission by adding modulation based on a driving signal to a carrier wave; and
performing a filtering process in which a peak value of a power spectral density of the optical signal for transmission is set to be equal to or less than a second reference value while an integrated value obtained by integrating the power spectral density of the optical signal for transmission in a frequency direction with respect to the optical signal for transmission or the driving signal is maintained at equal to or greater than a first reference value, and then transmitting the optical signal for transmission.

17. A method for receiving light comprising receiving an optical signal for transmission, generated by modulating a carrier wave, on which a first process is performed in which a peak value of a power spectral density of the optical signal for transmission is set to be equal to or less than a second reference value while an integrated value obtained by integrating the power spectral density of the optical signal for transmission in a frequency direction is maintained at equal to or greater than a first reference value, and performing a second process of compensating for the first process on a signal which is generated on the basis of the optical signal for transmission.

* * * * *